(12) United States Patent
Messina et al.

(10) Patent No.: US 7,305,123 B2
(45) Date of Patent: Dec. 4, 2007

(54) COLOR INTERPOLATION METHOD OF AN IMAGE ACQUIRED BY A DIGITAL SENSOR BY DIRECTIONAL FILTERING

(75) Inventors: Giuseppe Messina, Giardini Naxos (IT); Mirko Ignazio Guarnera, Gela (IT); Valeria Tomaselli, S. Pietro Clarenza (IT); Arcangelo Ranieri Bruna, San Cataldo (IT); Giuseppe Spampinato, Catania (IT); Alfio Castorina, Santa Venerina (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 249 days.

(21) Appl. No.: 11/243,212

(22) Filed: Oct. 4, 2005

(65) Prior Publication Data
US 2006/0072814 A1    Apr. 6, 2006

(30) Foreign Application Priority Data
Oct. 4, 2004    (IT) .......................... VA2004A0038

(51) Int. Cl.
*G06K 9/00* (2006.01)
(52) U.S. Cl. ..................................... 382/162; 382/300
(58) Field of Classification Search ........ 382/162–167, 382/300–301, 274–275, 199, 254, 260–266; 348/272–273, 446–452, 606–607; 358/1.9, 358/3.23, 3.27, 525, 532; 345/589–611
See application file for complete search history.

(56) References Cited

U.S. PATENT DOCUMENTS
6,229,578 B1 *    5/2001    Acharya et al. ............ 348/607

(Continued)

FOREIGN PATENT DOCUMENTS
WO    WO99/30547    6/1999

OTHER PUBLICATIONS

"Local Correlation Based CFA Interpolation", Aleksic et al., Electrical and Computer Engineering, 2004. Canadian Conference on Niagara Falls, Ont., Canada May 2-5, 2004, Piscataway, NJ, USA, IEEE, US, May 2, 2004, pp. 793-796 vol. 2, XP010733565, ISBN: 0-7803-8253-6.

(Continued)

*Primary Examiner*—Ishrat Sherali
(74) *Attorney, Agent, or Firm*—Lisa K. Jorgenson; Allen, Dyer, Doppelt, Milbrath & Gilchrist, P.A.

(57) ABSTRACT

Subdivision per basic color channels of grey level data generated by a color sensor is no longer required according to a novel color interpolation method of an image acquired by a digital color sensor generating grey levels for each image pixel as a function of the filter applied to the sensor by interpolating the values of missing colors of each image pixel for generating triplets or pairs of values of primary colors or complementary base hues for each image pixel. The method may include calculating spatial variation gradients of primary colors or complementary base hues for each image pixel and storing the information of directional variation of primary color or complementary base hue in look-up tables pertaining to each pixel. The method may further include interpolating color values of each image pixel considering the directional variation information of the respective values of primary colors or complementary hues stored in the respective look-up tables of the pixel for generating the multiple distinct values for each image pixel.

13 Claims, 9 Drawing Sheets

U.S. PATENT DOCUMENTS

| | | | |
|---|---|---|---|
| 6,882,365 B1* | 4/2005 | Aoki | 348/273 |
| 6,978,050 B2* | 12/2005 | Hunter et al. | 382/275 |
| 7,088,392 B2* | 8/2006 | Kakarala et al. | 348/272 |
| 7,154,556 B1* | 12/2006 | Wang et al. | 348/452 |
| 7,245,326 B2* | 7/2007 | Orlick | 348/448 |
| 2004/0179752 A1 | 9/2004 | Cheng et al. | 382/300 |

OTHER PUBLICATIONS

"High-Quality Linear Interpolation for Demosaicing of Bayer-Patterned Color Images", Malvar et al., Acoustics, Speech, and Signal Processing, 2004. Proceedings. (ICASSP '04). IEEE International Conference on Montreal, Quebec, Canada May 17-21, 2004, Piscataway, NJ, USA, IEEE, May 17, 2004, pp. 458-488, XP010718232, ISBN: 0-7803-8484-9.

:A Global Enhancement Pipeline for Low-cost Imaging Devices, Battiato et al., IEEE Transactions on Consumer Electronics, IEEE Inc., New York, US, vol. 49, No. 3, Aug. 2003, pp. 670-675, XP001172113, ISSN: 0098-3063.

"Bayer Image Enlargement Using Correlated Color Components", Battiato et al., 2002 Digest of Technical Papers, International Conference on Consumer Electronics (IEEE Cat No. 02CH37300) IEEE Piscataway, NJ, USA, 2002, pp. 230-231, XP002357651, ISBN: 0-7803-7300-6.

* cited by examiner

COLOR INTERPOLATION METHOD OF AN IMAGE ACQUIRED BY A DIGITAL SENSOR BY DIRECTIONAL FILTERING

FIELD OF THE INVENTION

This invention relates to techniques for processing images acquired by a color digital sensor, and, more particularly, to a method of color interpolation of each pixel of the image acquired from intensity values generated by single photosensitive elements of the sensor, depending on the filter applied according to a certain spatial pattern (for instance according the so-called Bayer Pattern) such to make each single element sensitive to one of the primary colors or base hue. Therefore, the output of a digital color sensor generates a grey level value for each image pixel depending on the filter applied to the particular image pixel.

BACKGROUND OF THE INVENTION

In order to reconstruct a color image it is usually necessary to carry out an operation known as color interpolation (or demosaicing) to generate triplets of base color values (RGB) or more values, one for each base hue, through appropriate interpolation algorithms for generating values of missing colors for each image pixel. Numerous techniques for processing data provided by a digital color sensor have been proposed. It is worth mentioning the following documents: M. R. Gupta, T. Chen, "Vector Color Filter Array Demosaicing" SPIE Electronic Imaging 2001; R. Ramanath, W. E. Snyder, G. L. Bilbro, W. A. Sander, "Demosaicing Methods for Bayer Color Arrays", Journal of Electronic Imaging, vol. 11, n. 3, pages 306-315, July 2002; R. Kimmel, "Demosaicing: Image Reconstruction from Color CCD Samples"; R. Kakarala, Z. Baharav, "Adaptive Demosaicing with The Principal Vector Method", IEEE Transactions on Consumer Electronics, vol. 48, n. 4, pages 932-937, November 2002; B. E. Bayer, "Color Imaging Array", U.S. Pat. No. 3,971,065, July 1976; B. K. Gunturk, Y. Altunbasak, R, Mersereau, "Color Plane Interpolation Using Alternating Projections", IEEE Transactions on Image Processing, vol. 11, no. 9, pages 997-1013, September 2002; S. Smith, "Colour Image Restoration with Anti-Alias", EP 1,098,535, May 2001. Many known techniques preliminarily subdivide the image data stream generated by the digital color sensor into two or more channels, such as three channels for the case of a filtering based upon the RGB triplet of primary colors (red, green, blue). When the red component of a pixel is to be estimated, but only its green level has been acquired, it is necessary to estimate the red pixels adjacent to the considered pixel, and so on, when the value of another missing color is to be estimated. Clearly, subdividing in different channels grey level data generated by the digital color sensor and the successive merging operation of the values calculated for primary colors or base hues with the known value of the primary color of base hue for the considered pixel implies an evident computational burden or, in case of hardware implementation, an increased circuit complexity.

The development of new consumer applications of digital photo-cameras and similar devices, for instance in cellular phones, in laptop (notebook) or hand-held computers, and other devices for mobile communications, encourages the need to devise more effective and at the same time low cost techniques for processing images acquired by a digital color sensor. A particular important factor is the low cost, because these techniques may desirably be used in devices economically accessible to individual consumers, and there is considerable competition in this field among manufacturers of these devices and their components.

SUMMARY OF THE INVENTION

It is an object of the invention to provide a new color interpolation algorithm that may not require any subdivision per channels of grey level data generated by a digital color sensor. According to the algorithm of this invention, the effectiveness in terms of definition and color rendition of the processed picture may be higher than that obtained using known methods based on subdivision per channels of data and on merging of data in terms of triplets or pairs of values of primary colors or complementary hues, respectively.

Basically, the color interpolation method of an image may be acquired by a digital color sensor generating grey levels for each image pixel as a function of the filter applied to the sensor, by interpolating the values of missing colors of each image pixel for generating triplets or pairs of values of primary colors (RGB) or complementary hues for each image pixel. The method may comprise calculating spatial variation gradients of primary colors or complementary hues for each image pixel and storing the information of directional variation of primary color or complementary hue in look-up tables pertaining to each pixel.

The method may further comprise interpolating color values of each image pixel considering the directional variation information of the respective values of primary colors or complementary hues stored in the respective look-up tables of the pixel for generating the multiple distinct values for each image pixel.

According to a preferred embodiment, spatial variation gradients may be calculated using differential filters, preferably Sobel operators over image pixels detected without subdividing them depending on the color. Preferably, the interpolation of the respective values of primary colors or base hue may be carried out using an elliptical Gaussian filter the orientation of which coincides with the calculated direction of the respective spatial gradient for the pixel being processed.

In order to compensate for the emphasis introduced by calculating the spatial gradients of the low spatial frequency components, due to the fact that values of the same primary color or complementary hue of the pixel adjacent to the processed pixel are used, the method may optionally include an additional enhancement operation of the high spatial frequency components. The invention may further provide a simple and effective method for calculating direction and amplitude values of a spatial gradient in correspondence of an image pixel. The methods of this invention may be implemented by a software computer program.

DETAILED DESCRIPTION OF THE PREFERRED EMBODIMENTS

"Bayer pattern" filtering is based on the use of primary color filters: red (R), green (G) and blue (B). It is widely used in digital color sensors and for this reason the method of this invention is now described in detail referring to this application, though the same considerations apply mutatis mutandis for systems for acquiring color images based on filters of two or more complementary hues applied according to spatial patterns different from the Bayer pattern.

Figure 1:
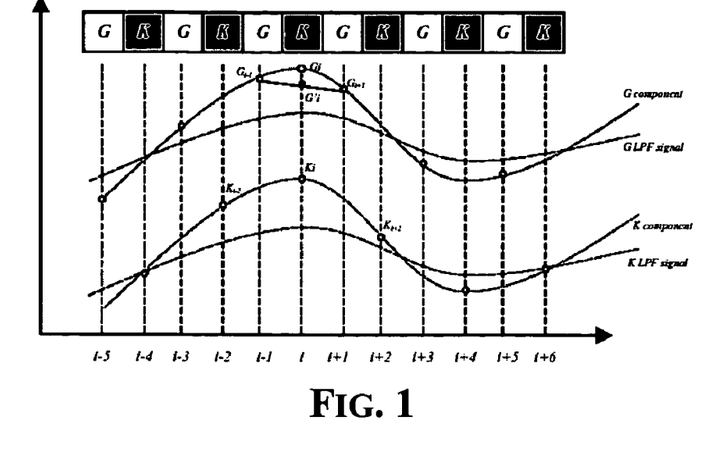
FIG. 1 shows the correlation among different channels in a color picture in accordance with the invention.
Figure 2:
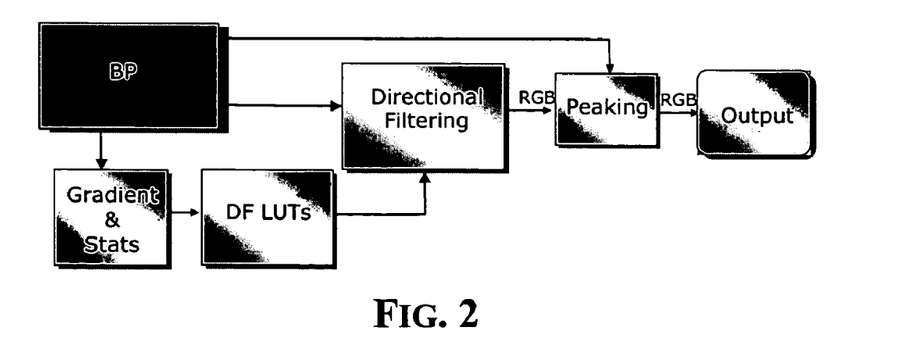
FIG. 2 is a flow chart illustrating data flow in accordance with the invention.

According to the invention, it is supposed that the red and blue channels, especially at low frequencies, be highly correlated with the green channel in a small interval, as shown in the example of FIG. 1. If, for example, the central pixel is red, it is possible to assume that the low-pass component of the green channel is $$G_{LPF}(i,j) = R_{LPF}(i,j) + \Delta RG \qquad (1)$$

wherein $\Delta RG$ is an appropriate value that depends on the pixels that surround the considered pixel, and $$G_{LPF}(i,j) = f_1(i,j) \qquad (2)$$

$$R_{LPF}(i,j) = f_2(i,j) \qquad (3)$$

wherein $f_1$ and $f_2$ are interpolation functions of the central pixel determined from the surrounding pixel.

This implies that the interpolation, for instance, of the missing green pixels may advantageously exploit the information coming from the red and blue channels. In practice, according to the invention, the missing pixels are interpolated without splitting the image into the component channels. This model uses differences between different channels (that may be seen as chromatic information), is susceptible of generating optimal results because the human eye is more sensitive to low frequency chromatic variations than to luminance variations.

In order to estimate the direction of an edge depicted in the picture it is necessary to calculate in the CFA (Color Filter Array) image the variation along the horizontal and vertical directions. A preferred way of calculating these variations comprises using the well known Sobel filters along an horizontal x axis and a vertical y axis:

$$Sobel_y = \begin{bmatrix} 1 & 2 & 1 \\ 0 & 0 & 0 \\ -1 & -2 & -1 \end{bmatrix}; Sobel_x = \begin{bmatrix} 1 & 0 & -1 \\ 2 & 0 & -2 \\ 1 & 0 & -1 \end{bmatrix} \qquad (4)$$

So far, the Sobel filters have been used on the same channel (R or G or B), or on a same luminance channel. According to the invention, the Sobel filters are used directly on the combination of the three channels RGB. The demonstration that the Sobel filters can be usefully applied to a Bayer pattern is not simple and is given hereinafter.

Let us consider a 3×3 Bayer pattern:

$$P = \begin{bmatrix} G_1 & J_2 & G_3 \\ H_4 & G_5 & H_6 \\ G_7 & J_8 & G_9 \end{bmatrix} \qquad (5)$$

wherein $G_i$ for i=1, 3, 5, 7, 9 are the intensities of the green pixels and $H_i$ and $J_i$ are respectively the intensities of the red and blue pixels. Considering Eq. (1), it is possible to approximate the intensity of the missing green pixels.

It is thus obtained that the channel G (corresponding to the considered central pixel in the example) is described by the following matrix P':

$$P' = \begin{bmatrix} G_1 & J_2 + \Delta_1 & G_3 \\ H_4 + \Delta_2 & G_5 & H_6 + \Delta_3 \\ G_7 & J_8 + \Delta_4 & G_9 \end{bmatrix} \qquad (6)$$

The convolution between the matrix P' and the matrix that describes the Sobel filter along the vertical direction ($Sobel_y$) is:

$$P' \cdot Sobel_y = \begin{bmatrix} G_1 & J_2 + \Delta_1 & G_3 \\ H_4 + \Delta_2 & G_5 & H_6 + \Delta_3 \\ G_7 & J_8 + \Delta_4 & G_9 \end{bmatrix} \otimes \begin{bmatrix} 1 & 2 & 1 \\ 0 & 0 & 0 \\ -1 & -2 & -1 \end{bmatrix} \qquad (7)$$

$$= G_1 + 2(J_2 + \Delta_1) + G_3 - G_7 - 2(J_8 + \Delta_4) - G_9.$$

The unknown parameters are only $\Delta_1$ and $\Delta_4$. These two parameters are estimated in a small image portion, thus it may be reasonably presumed that they are almost equal to each other and that their difference is negligible. As a consequence, Eq. (7) becomes $$P' \cdot Sobel_y = G_1 + 2J_2 + G_3 - G_7 - 2J_8 - G_9 \qquad (8)$$

It may be immediately noticed that, by applying the Sobel filter directly on the Bayer pattern of Eq. (5), the same result given by Eq. (8) is obtained. Therefore, using this filter $Sobel_y$ on a Bayer pattern is equivalent to calculating the corresponding spatial variation value along the y direction. By using the filter $Sobel_x$ along the horizontal direction, another value $P' \cdot Sobel_x$ is obtained that provides a corresponding spatial variation value along the x direction. For each pixel of the Bayer pattern the values $P' \cdot Sobel_x$ and $P' \cdot Sobel_x$ are calculated. According to the method of the invention, these values are collected in look-up tables for estimating the direction of the reconstruction filter.

Figure 3:
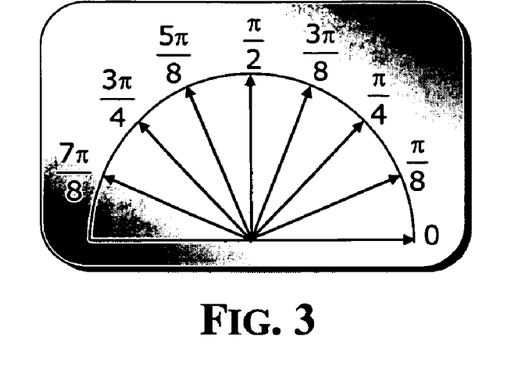
FIG. 3 shows quantized directions for spatial gradients of image pixels in accordance with the invention.
Figure 4A:
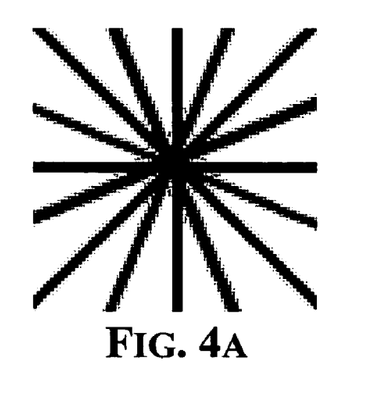
FIGS. 4a and 4b show the same picture filtered with a weighted-mode directional filter in accordance with the invention and without such a filter.
Figure 4B:
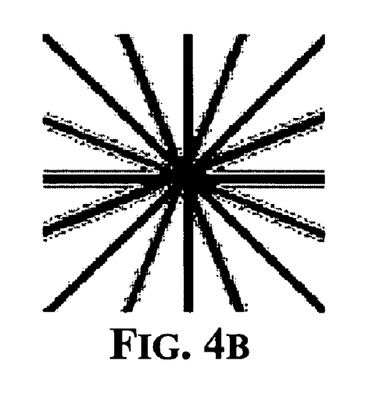

The orientation of the spatial gradient in correspondence to a certain pixel is given by the following formula:

$$or(x, y) = \begin{cases} \tan^{-1}\left(\dfrac{P' \cdot Sobel_y(x, y)}{P' \cdot Sobel_x(x, y)}\right) & \text{if } P' \cdot (Sobel_x(x, y)) \neq 0 \\ \dfrac{\pi}{2} & \text{otherwise} \end{cases} \quad (9)$$

wherein $P' \cdot Sobel_y$ and $P' \cdot Sobel_x$ are the filtered values with the horizontal and vertical Sobel filters centered in a given pixel. The orientation or $(x,y)$ is preferably quantized in k pre-defined directions, for instance those depicted in FIG. 3:

$$direction_i = \frac{i \cdot \pi}{k}, \text{ wherein } i = [0, k-1], k \in \mathbb{N} \quad (10)$$

If the calculated orientation value or$(x,y)$ belongs to a fixed interval i, the orientation will be quantized by the value $direction_i$:

$$or(x,y) = \{direction_i | direction_i \leq or(x,y) < direction_{i+1}\} \quad (11)$$

The square of the absolute value of the spatial gradient mag$(x,y)$ is calculated according to the following formula:

$$mag(x,y) = (P' \cdot Sobel_x)^2 + (P' \cdot Sobel_y)^2 \quad (12)$$

It is preferable to consider the square of the absolute value for avoiding square roots, the calculation of which would slow down the method of the invention. For each calculated orientation of the spatial gradients, a new operator, purposely designed for the preferred embodiment of the method of the invention, that hereinafter will be indicated as the "weighted-mode" (WM) operator, is used. This operator substantially provides an estimation of the predominant amplitude of the spatial gradient around the central pixel by performing the operations of: storing the amplitude values for each pixel around a central pixel according to the following formula $$Acc(x, y, i) = \sum_{u=-1}^{1} \sum_{v=-1}^{1} mag(x+u, y+v) \cdot t(x+u, y+v, i) \quad (13)$$

wherein $u=[-1, +1]$, $v=[-1, +1]$, $i \in [0, k-1]$, $k \in \mathbb{N}$ and Acc is an array of k possible orientations;

$$t(x, y, i) = \begin{cases} 0 & \text{if } or(x, y) \neq direction_i \\ 1 & \text{otherwise} \end{cases} \quad (13\text{ bis})$$

calculating the predominant amplitude WM with the following formula:

$$WM(x, y) = \max_{i=0 \ldots k} (Acc(x, y, i)) \quad (14)$$

Figure 5A:
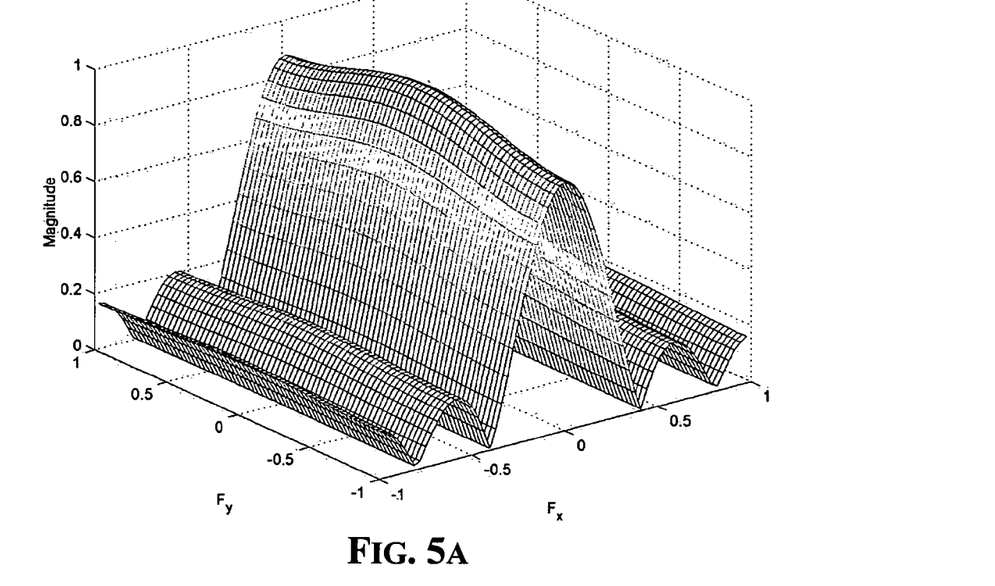
FIGS. 5a and 5b show two examples of frequency responses of directional filters at $\pi/2$ and 0 in accordance with the invention.
Figure 5B:
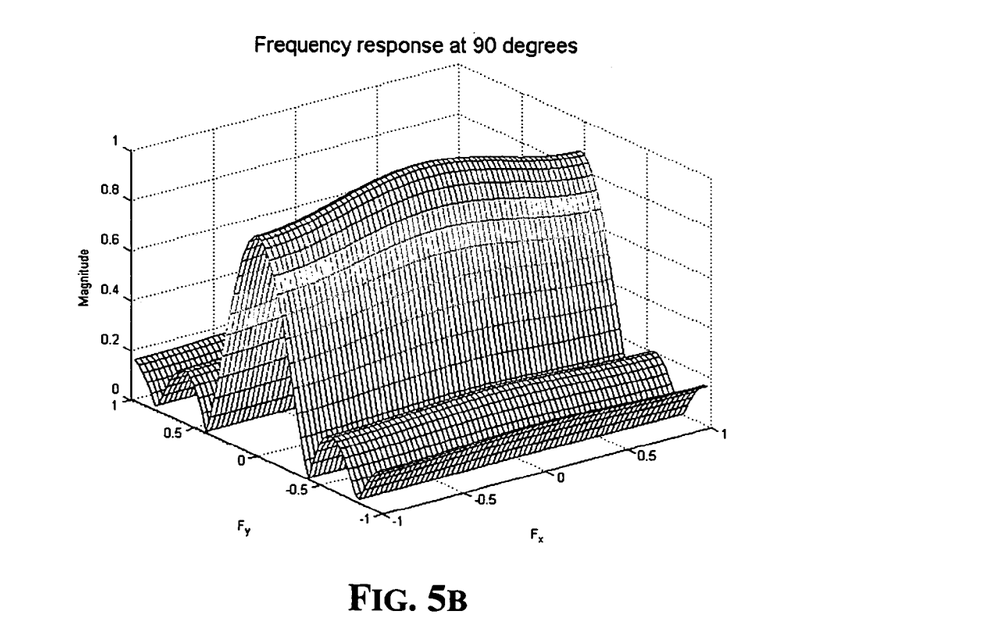
Figure 6:
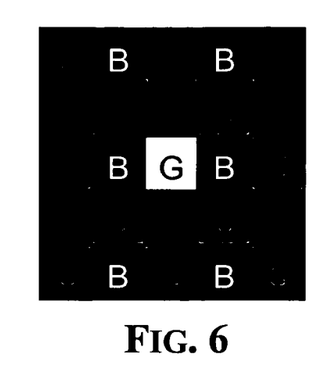
FIG. 6 shows a Bayer pattern with a central green pixel in accordance with the invention.
Figure 7:
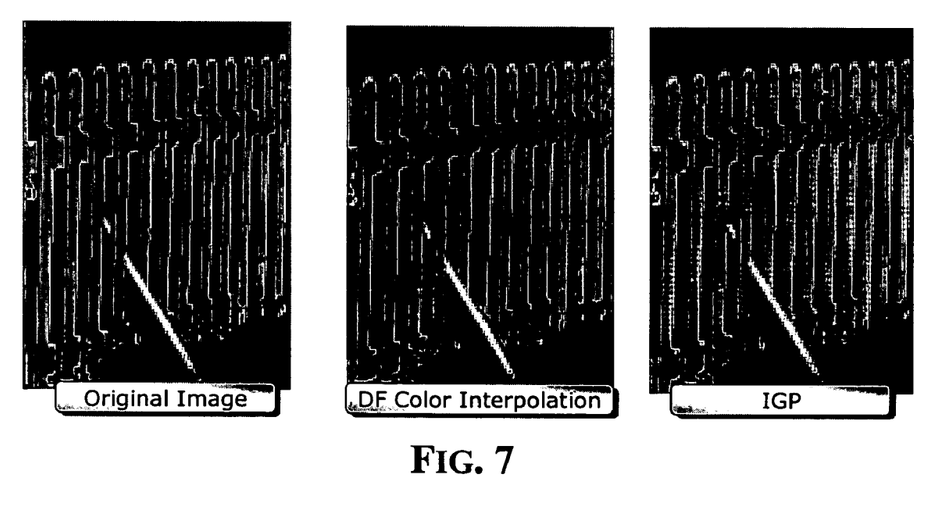
FIGS. 7 through 10 compare pictures obtained with the known method IGP and with the method of this invention using a directional filtering interpolation (DF).
Figure 8:
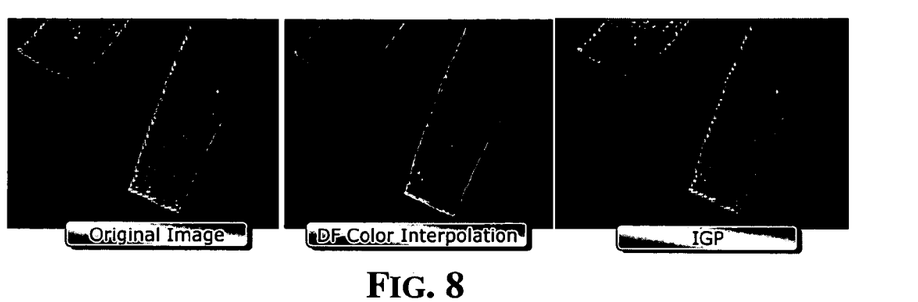
Figure 9:
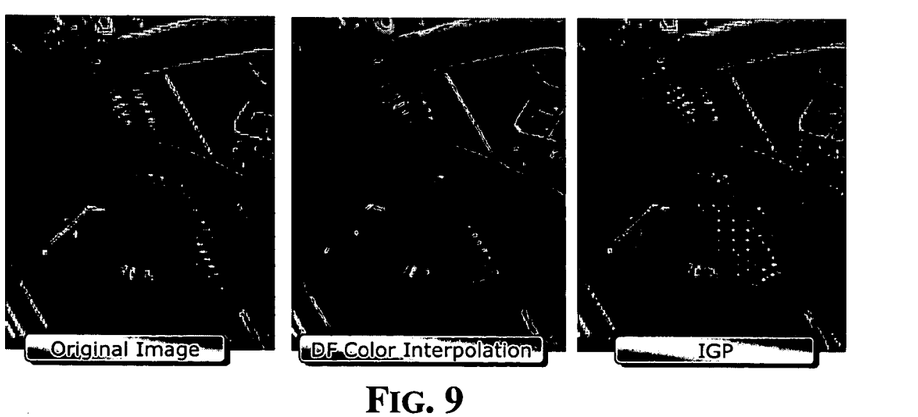
Figure 10:
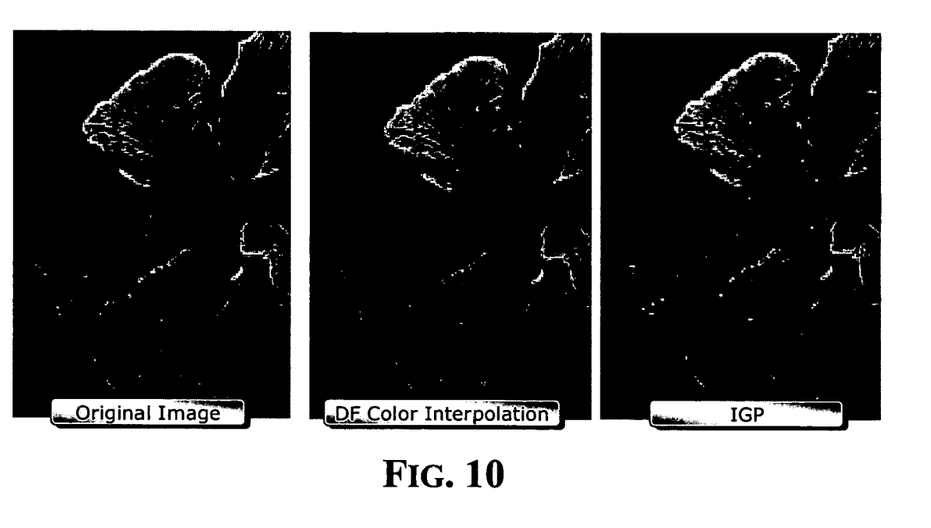

The operator WM is a sort of morphological operator that enhance the edges. This operator is used for preventing the effects due to the presence of noise in estimating the spatial gradient. According to an embodiment of the invention, the interpolation filtering is carried out by means of an elliptical Gaussian filter described by the following formula:

$$f(x, y, \alpha) = h \cdot e^{-\frac{\tilde{x}^2}{2\sigma_x^2} - \frac{\tilde{y}^2}{2\sigma_y^2}}, \quad (15)$$

wherein $$\tilde{x} = x \cos(\alpha) - y \sin(\alpha),$$

$$\tilde{y} = x \sin(\alpha) + y \sin(\alpha), \quad (16)$$

and $\sigma_x$, $\sigma_y$ are the standard deviations along the directions x and y, respectively, h is a normalization constant and $\alpha$ is the orientation angle, as shown in FIG. 5. According to the invention, the orientation of the filter to be applied in a pixel coincides with the orientation of the spatial filter calculated for that pixel. The filter provides the low-pass red $R_{LPF}$, green $G_{LPF}$ and blue $B_{LPF}$ components, preserving the image from zig-zag effects and false colors (artifacts).

A low-pass component is calculated using a spectral formulation, as defined in the following formula:

$$Comp(l,m) = Mask(l,m) \cdot F(l,m) \cdot I(l,m) \quad (17)$$

wherein Mask $(l,m)$ identifies the pixels of the spectral components $(l,m)$ (red, green or blue), F is one of the above mentioned Gaussian filters and I is the input picture.

In order to further enhance the quality of the generated picture, it is possible to carry out the so-called "peaking" operation, that substantially comprises introducing in the filtered image high frequency components that were lost during the low-pass filtering with the directional Gaussian filter. This operation will be described referring to the case in which the central pixel of the selection frequency of the Bayer pattern is a green pixel G. Being $G_{LPF\_DF}$ the low-pass component of this pixel obtained with the directional filter, the lost high frequency component $\Delta_{Peak}$ is given by the following equation $$\Delta_{Peak} = G - G_{LPF\_DF} \quad (18)$$

In practice, the high frequency component is obtained as the difference between the known effective value of the central pixel G and the corresponding low-pass filtered value $G_{LPF\_DF}$. The central pixel is kept unchanged in the interpolated image, while the reconstructed low-pass blue and red values are increased by the quantity $\Delta_{Peak}$ for enhancing the high frequency components. Substantially, the intensity H of the red and blue central pixels is obtained with the following formula:

$$H = H_{LPF\_DF} + \Delta_{Peak} \quad (19)$$

Various experiments have been carried out for comparing original images with images filtered with the method of this invention using a directional filtering (DF), and with images interpolated with the known method IGP [7]. The method of this invention has been implemented with the just described "peaking" operation. The results are shown in the FIGS. from 7 to 10.

Figure 11:
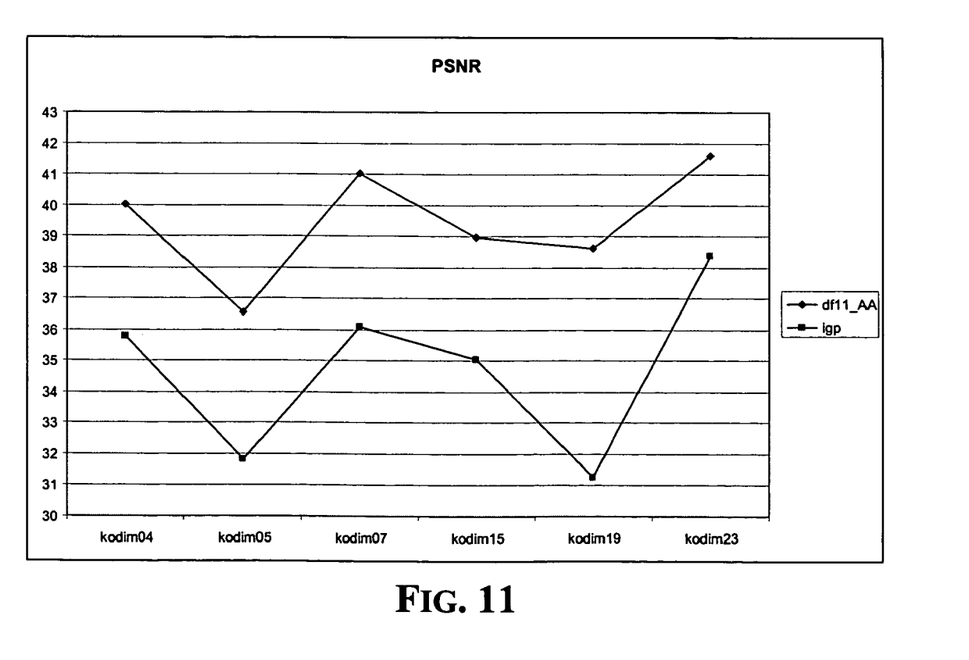
FIG. 11 compares different PSNR values of different images taken from a standard image database for the method of this invention and the known method IGP.

FIG. 11 compares the PSNR values obtained for the method of this invention and the known method IGP for different images extracted from a standard database of images (http://r0k.us/graphics/kodak). As it is possible to notice, the method of the invention based on the directional filtering DF ensures higher signal/noise ratios than the known method IGP.

The color interpolation method of the invention may be incorporated in any process for treating digital Bayer images. Tests have shown that the method of this invention relevantly limits the generation of false colors and/or zig-zag effects, compared to the known color interpolation methods. In order to further improve the quality of images obtained with any process for treating Bayer images including the method of the invention, it is possible to carry out any anti-aliasing algorithm.

Figure 12:
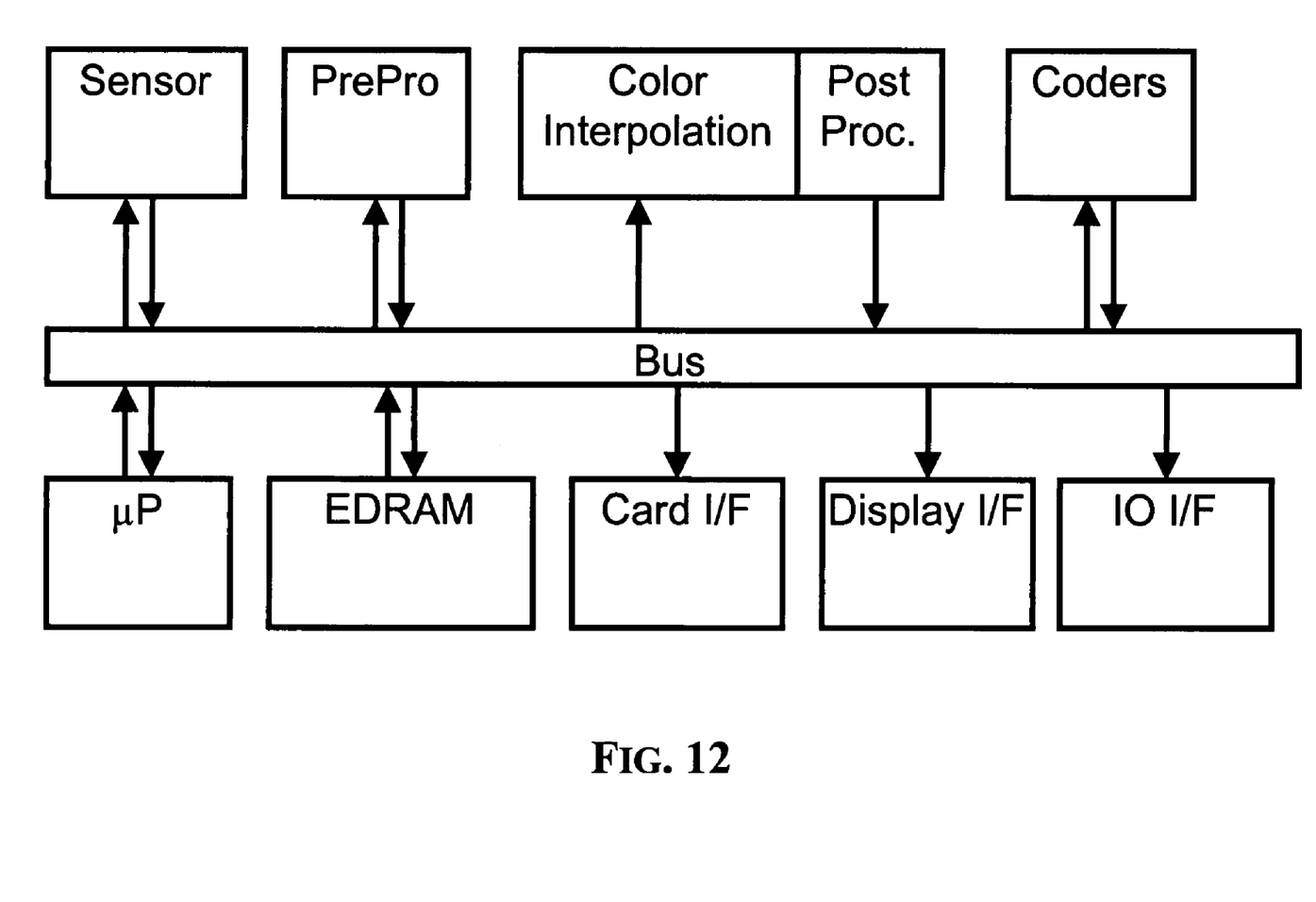
FIG. 12 shows a sample device that carries out a color interpolation algorithm in accordance with the invention.
Figure 13:
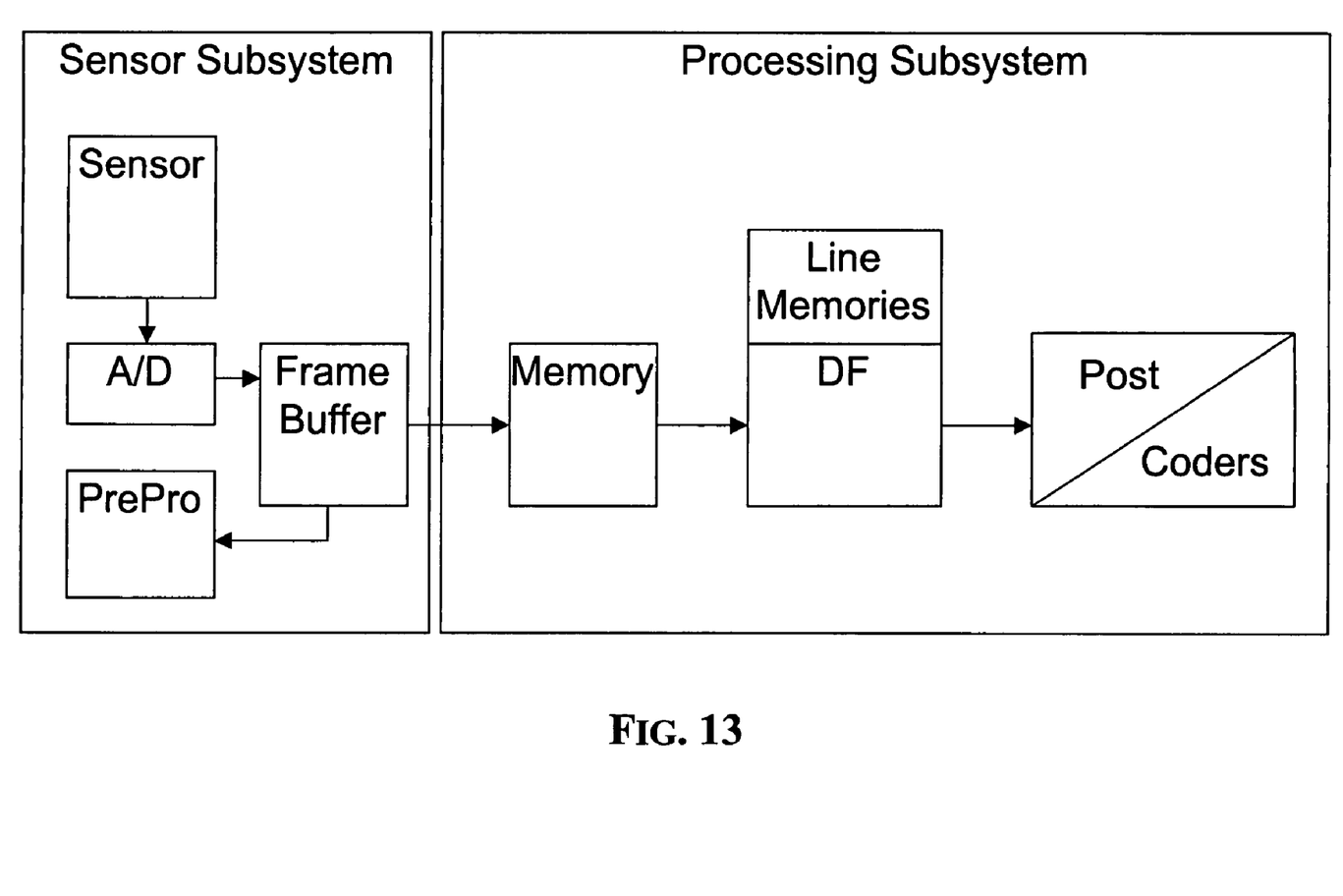
FIG. 13 is a flow chart of an image enhancement process that uses the method of this invention, indicated by the label DF.

FIG. 12 shows a sample device, such as a digital photo-camera, that carries out a color interpolation algorithm. FIG. 13 is a flow chart of a process for treating images comprising the method of the invention, schematically indicated by the label DF.

Figure 14:
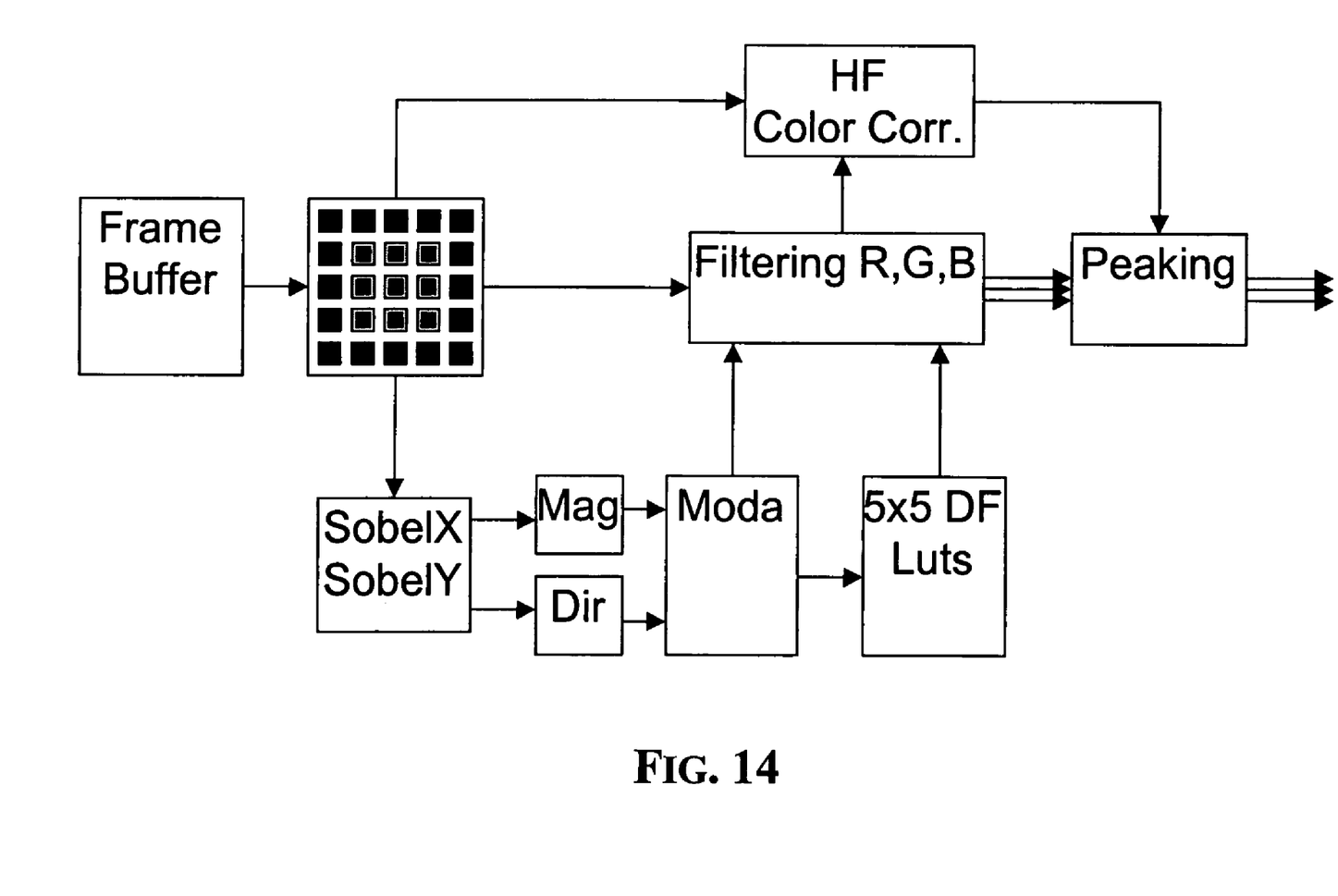
FIG. 14 shows an architecture implementing the method of this invention.

FIG. 14 shows an architecture implementing the preferred embodiment of the method of this invention, wherein each single block carries out one of the above operations. The meaning of each functional block will be evident for any skilled person, thus this architecture will not be described.

That which is claimed is:

1. A method of color interpolation of an image acquired by a digital color sensor generating grey level values for each image pixel as a function of a filter applied to the sensor by interpolating values of missing colors of each image pixel for generating distinct values of primary colors or complementary base hues for each image pixel, the method comprising:

calculating spatial variation gradients of primary colors or complementary base hues for each image pixel and storing directional variation information of a primary color or complementary base hue in look-up tables pertaining to each pixel; and interpolating values of each image pixel based upon the directional variation information of the respective values of primary colors or complementary base hues stored in the respective look-up tables of the pixel for generating multiple distinct values for each image pixel.

2. The method according to claim 1, wherein the spatial variation gradients have components along two coordinate directions that are calculated using Sobel operators on sensed values of the image pixels, and the look-up tables are generated using for each image pixel a "weighted-mode" operator over a window centered on a selected image pixel, and comprising storing amplitude values and quantized direction values of the spatial variation gradients for each pixel around a central pixel as a function of the calculated components;

for each quantized orientation, calculating a sum of the amplitudes of the gradients oriented in a direction for each of the pixels contained in the window;

establishing which of the sums is a largest sum; and calculating the amplitude value of the gradient associated with the central pixel as a function of the largest sum.

3. The method according to claim 1, wherein the interpolation of the respective values of primary colors or base hues is carried out using an elliptical Gaussian filter whose orientation coincides with the calculated direction of the relative spatial gradient for the pixel being processed.

4. The method according to claim 3, further comprising enhancing high spatial frequency components of missing pixels by choosing a selection window of pre-established size centered on an image pixel;

calculating a difference ($\Delta_{Peak}$) between a present value of the central pixel and a value thereof calculated with the elliptical Gaussian filter;

enhancing the high frequency components of central pixels missing in the selection window by adding the difference ($\Delta_{Peak}$) to their interpolated value.

5. A method for determining amplitude values and orientation values of a spatial gradient for a pixel belonging to an image acquired by a digital color sensor generating grey level values for each image pixel as a function of a filter applied to the sensor, the method comprising:

a) choosing a selection window of a predefined size centered on the image pixel;

b) calculating spatial variation values along two orthogonal directions through Sobel operators applied to pixels selected by the window;

c) calculating amplitude and orientation of the spatial gradient as a function of the spatial variation components;

d) quantizing the calculated orientation, thus determining an orientation to be determined of the gradient in the image pixel;

e) repeating steps b) to d) for each pixel contained in the selection window;

f) for each quantized orientation, calculating a sum of the amplitudes of the gradients with the orientation for each pixel contained in the window;

g) determining which of the sums is the largest sum;

h) calculating the amplitude value of the gradient associated to the central pixel as a function of the largest sum.

6. A processor readable storage medium containing processor readable code for programming a processor to perform a method of color interpolation of an image acquired by a digital color sensor generating grey level values for each image pixel as a function of a filter applied to the sensor by interpolating values of missing colors of each image pixel for generating distinct values of primary colors or complementary base hues for each image pixel, the method comprising:

calculating spatial variation gradients of primary colors or complementary base hues for each image pixel and storing directional variation information of a primary color or complementary base hue in look-up tables pertaining to each pixel; and interpolating values of each image pixel based upon the directional variation information of the respective values of primary colors or complementary base hues stored in the respective look-up tables of the pixel for generating multiple distinct values for each image pixel.

7. The processor readable storage medium according to claim 6, wherein the spatial variation gradients have components along two coordinate directions that are calculated using Sobel operators on sensed values of the image pixels, and the look-up tables are generated using for each image pixel a "weighted-mode" operator over a window centered on a selected image pixel, and comprising storing amplitude values and quantized direction values of the spatial variation gradients for each pixel around a central pixel as a function of the calculated components;

for each quantized orientation, calculating a sum of the amplitudes of the gradients oriented in a direction for each of the pixels contained in the window;

establishing which of the sums is a largest sum; and calculating the amplitude value of the gradient associated with the central pixel as a function of the largest sum.

8. The processor readable storage medium according to claim 6 wherein the interpolation of the respective values of primary colors or base hues is carried out using an elliptical Gaussian filter whose orientation coincides with the calculated direction of the relative spatial gradient for the pixel being processed.

9. The processor readable storage medium according to claim 6, further comprising enhancing high spatial frequency components of missing pixels by choosing a selection window of pre-established size centered on an image pixel;

calculating a difference ($\Delta_{Peak}$) between a present value of the central pixel and a value thereof calculated with the elliptical Gaussian filter;

enhancing the high frequency components of central pixels missing in the selection window by adding the difference ($\Delta_{Peak}$) to their interpolated value.

10. An electronic device for color interpolation of an image acquired by a digital color sensor generating grey level values for each image pixel as a function of a filter applied to the sensor by interpolating values of missing colors of each image pixel for generating distinct values of primary colors or complementary base hues for each image pixel, the electronic device comprising:

a processing subsystem cooperating with the sensor to calculate spatial variation gradients of primary colors or complementary base hues for each image pixel and storing directional variation information of a primary color or complementary base hue in look-up tables pertaining to each pixel; and interpolate values of each image pixel based upon the directional variation information of the respective values of primary colors or complementary base hues stored in the respective look-up tables of the pixel for generating multiple distinct values for each image pixel.

11. The electronic device according to claim 10, wherein said processing subsystem calculates components along two coordinate directions of the spatial variation gradients using Sobel operators on sensed values of the image pixels, and said processing subsystem generates the look-up tables using a "weighted-mode" operator over a window centered on a selected image pixel for each image pixel by storing amplitude values and quantized direction values of the spatial variation gradients for each pixel around a central pixel as a function of the calculated components, for each quantized orientation, calculating a sum of the amplitudes of the gradients oriented in a direction for each of the pixels contained in the window, establishing which of the sums is a largest sum, and calculating the amplitude value of the gradient associated with the central pixel as a function of the largest sum.

12. The electronic device according to claim 10, wherein said processing subsystem interpolates the respective values of primary colors or base hues using an elliptical Gaussian filter whose orientation coincides with the calculated direction of the relative spatial gradient for the pixel being processed.

13. The electronic device according to claim 12, wherein said processing subsystem enhances high spatial frequency components of missing pixels by choosing a selection window of pre-established size centered on an image pixel, calculating a difference ($\Delta_{Peak}$) between a present value of the central pixel and a value thereof calculated with the elliptical Gaussian filter, and enhancing the high frequency components of the central pixels missing in the selection window by adding the difference ($\Delta_{Peak}$) to their interpolated value.

* * * * *

UNITED STATES PATENT AND TRADEMARK OFFICE
CERTIFICATE OF CORRECTION

PATENT NO. : 7,305,123 B2 Page 1 of 1
APPLICATION NO. : 11/243212
DATED : December 4, 2007
INVENTOR(S) : Messina et al.

It is certified that error appears in the above-identified patent and that said Letters Patent is hereby corrected as shown below:

Column 6, Line 34  Delete: "the-central"
Insert: --the central--

Column 9, Line 6  Delete: "claim 6"
Insert: --claim 8--

Signed and Sealed this

Fourteenth Day of October, 2008

JON W. DUDAS
*Director of the United States Patent and Trademark Office*